INVENTOR.
GEORGE W. GOETZ
BY
Yount, Flynn and Tarolli
ATTORNEYS $V_R$ used to fill 20% to 95% of confinement within .010 to 0.100 second.
K = 1.4

INVENTOR.
GEORGE W. GOETZ

BY
Yount, Flynn and Tarolli
ATTORNEYS

3,516,685
INFLATABLE CONFINEMENT VEHICLE SAFETY APPARATUS
George W. Goetz, Detroit, Mich., assignor to Eaton Yale & Towne Inc., Cleveland, Ohio, a corporation of Ohio
Filed Nov. 8, 1967, Ser. No. 681,393
Int. Cl. B60r 21/10
U.S. Cl. 280—150                 6 Claims

ABSTRACT OF THE DISCLOSURE

A vehicle safety apparatus comprises a confinement having a collapsed inoperative condition in which said confinement protects the occupant of a vehicle by restraining movement of the occupant during a vehicle collision. The apparatus includes a reservoir and means for effecting the flow of gas from the reservoir to effect inflation of the confinement within an inflation time range of .010 to .100 second. The apparatus is constructed in accordance with mathematical formulations so that between 20 and 95% of the gas available in the reservoir is utilized to fill the confinement within the inflation time.

---

The present invention relates to vehicle safety apparatus, and particularly relates to vehicle safety apparatus which includes an inflatable confinement which has a collapsed inoperative condition and an expanded operative condition and which when in its expanded operative condition operates to restrain movement of an occupant of a vehicle during a collision.

There is known vehicle safety apparatus which includes an inflatable confinement which has a collapsed inoperative condition and an expanded operative condition. In such apparatus the confinement is constructed so as to protect the occupant of the vehicle during a collision by restraining movement of the occupant of the vehicle during the collision. The confinement is expanded by the flow of gas from a reservoir. While such vehicle safety apparatus has been known, none has ever been constructed such that the safety apparatus would operate in a manner reliable enough to be actually applied to a vehicle, such as an automobile, except possibly experimentally.

The present invention is directed to a vehicle safety apparatus which includes an inflatable confinement and which is constructed in accordance with mathematical formulations which have been derived, and which provide for the construction of an operative reliable system. The formulations were derived after much experimental work and study and based upon such work and study.

Accordingly, the principal object of the present invention is the provision of a new and improved vehicle safety apparatus which includes a confinement having a collapsed inoperative condition and an expanded operative condition in which the confinement protects the occupant of the vehicle by restraining movement of the occupant during a vehicle collision, and wherein the apparatus is constructed in a manner making it highly reliable and practical.

A further object of the present invention is the provision of a new and improved vehicle safety apparatus constructed in accordance with mathematical formulations which include certain parameters determined to provide a reliable practical apparatus capable of protecting an occupant of a vehicle in a collision.

A still further object of the present invention is the provision of a new and improved vehicle safety apparatus which includes a confinement having a collapsed inoperative condition and an expanded operative condition in which the confinement protects an occupant of a vehicle in a collision by restraining movement of the occupant due to the collision and wherein the confinement is expanded by the flow of gas from a reservoir within an inflation time of .010 and .100 second after the collision and wherein 20 to 95% of the gas available in the reservoir is utilized to fill the confinement within the inflation time.

Another object of the present invention is the provision of a new and improved vehicle safety apparatus which includes an inflatable confinement which has a collapsed inoperative condition and an expanded operative condition and means for providing for the flow of gas from a reservoir to effect inflation of the confinement, and wherein the pressure and volume of the reservoir are determined by a mathematical equation expressing the pressure and volume of the reservoir as a function of the pressure and volume desired in the confinement, and wherein the gas flows through an orifice or a nozzle having a discharge coefficient and throat area which is a function of the confinement inflation time and volume of the reservoir.

Still another object of the present invention is the provision of a new and improved vehicle safety apparatus which includes an inflatable confinement which when inflated restrains movement of an occupant of a vehicle during a collision and means for providing a flow of gas into the confinement to effect inflation of the confinement, and wherein the product of the pressure and volume in the reservoir is within a range of $$(5 \text{ to } 1.05)\left(\frac{2K-1}{K}P_\text{B}V_\text{B}\right)$$

where K equals the ratio of specific heats of the gas, and wherein the gas flows through a nozzle having a discharge coefficient C and throat area A within the range determined by the equation $CAU_0t/V_\text{R} = .28$ to $4.41$ where $U_0$ equals th sound speed of the gas flow in the reservoir, $t$ equals the time of the inflation of the confinement falling within .010 and .100 second, and $V_\text{R}$ equals the volume of the fluid reservoir.

Further objects and advantages of the present invention will be apparent from the following detailed description of a preferred embodiment of the present invention made with reference to the accompanying drawing forming a part of this specification and in which.

The present invention provides a practical and reliable vehicle safety apparatus which may be applied to vehicles to restrain movement of an occupant of the vehicle during a collision. The vehicle safety apparatus is constructed in accordance with mathematical formulations in order to provide a safety apparatus which is reliable in operation. The vehicle safety apparatus constructed in accordance with the present invention may be applied to a variety of types of vehicles, such as airplanes, trucks or automobiles.

Figure 1:
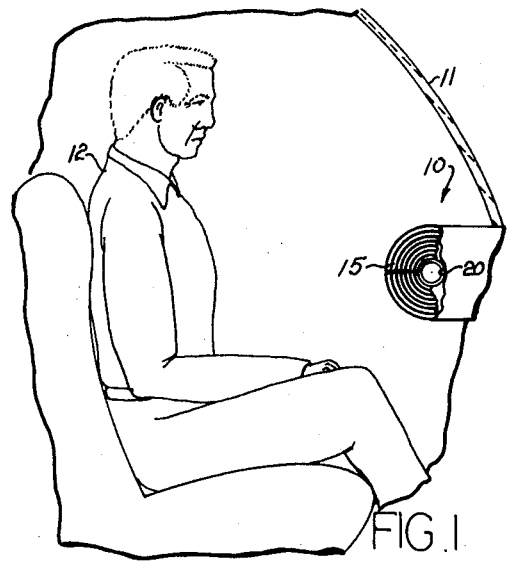
FIGS. 1–5 are schematic views illustrating the position of the occupant of a vehicle and the condition of a confinement in the vehicle at various times during a collision.

As representative of the present invention, a vehicle safety apparatus 10 is illustrated in FIG. 1 as applied to an automotive vehicle 11. The vehicle safety apparatus 10 is constructed so as to provide protection to the occupant 12 of the vehicle during a collision. The vehicle safety apparatus 10 includes a confinement 15 which has a collapsed inoperative condition and an expanded operative condition, shown in full lines in FIG. 2 and designated A. The confinement 15 when in its expanded operative condition protects the occupant 12 of the vehicle from forceful impact with structural parts of the vehicle by restraining movement of the occupant of the vehicle relative to the vehicle during a vehicle collision.

The confinement 15 may be located in any particular location in the vehicle so as to provide the desired protection to the occupant when the confinement is inflated to its operative condition. The confinement may be mounted and is illustrated in the drawing as applied to the dashboard of the vehicle; however, the confinement may be mounted in association with the back of the front seat, the door panels, the steering wheel, and in any location in the vehicle, in order to provide the desired protection to an occupant of the vehicle.

Figure 6:
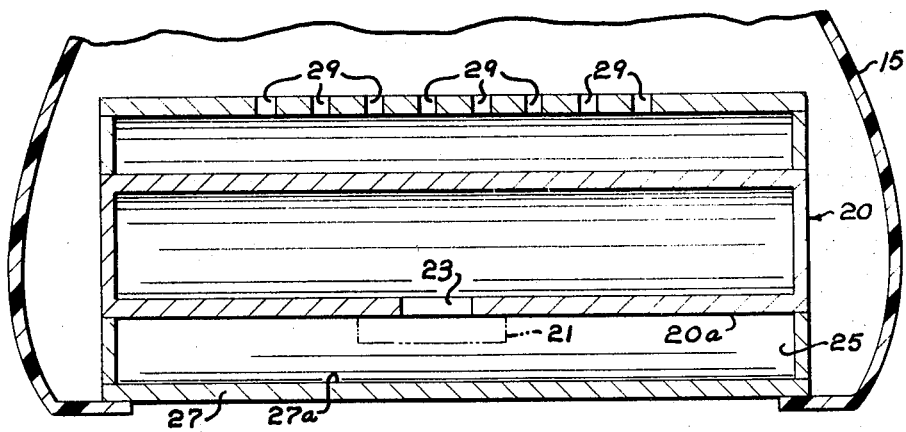
FIG. 6 is a schematic representation of the vehicle safety apparatus shown in FIG. 1 for illustrative and descriptive purposes only.

The confinement 15 is inflated to its expanded operative condition by the flow of gas into the confinement. Accordingly, the vehicle safety apparatus 10 includes a fluid reservoir 20 which contains a supply of gas under high pressure. The gas preferably is nitrogen maintained at approximately 2,000–4,000 p.s.i. The fluid reservoir 20, as best shown in FIG. 6, is a closed, elongate tubular container. Means are provided in association with the reservoir 20 to effect the formation of an opening in the reservoir 20 to provide for gas flow from the reservoir 20 and into the confinement 15 upon the vehicle encountering a collision condition. The means for effecting the formation of the opening in the reservoir 20 preferably comprises an explosive-actuated device, shown in phantom lines and designated 21 in FIG. 6. The explosive may be associated with the reservoir 20 in a variety of manners so as to effect the formation of an opening in the reservoir, and reference may be made to copending application Ser. No. 664,882, assigned to the assignee of the present invention, for a specific illusttration of how an explosive may be mounted in association with the fluid reservoir 20 to effect an opening in the fluid reservoir 20 in response to the vehicle encountering a collision condition. The explosive 21 may be actuated or detonated upon the flow of electrical current through the explosive 21, as described in the aforementioned application, and which current is provided by the actuation of a suitable sensor which is actuated in response to the vehicle encountering a collision condition.

As shown in FIG. 6, the gas in the reservoir 20 flows through an opening 23 which is formed in the reservoir 20 by the explosive 21. The opening 23 in the reservoir 20 illustrated in FIG. 6 communicates with a chamber 25 defined by the outer surface 20a of the reservoir 20 and the inner surface 27a of a diffuser member 27 which encircles the reservoir 20 and is mounted in association therewith. The diffuser member 27 is provided with a plurality of slots 29 on the side thereof opposite the side where the explosive 21 is mounted. The opening 23 provided by the explosive 21 in the present embodiment comprises a nozzle through which gas from the reservoir flows. The nozzle 23 is the minimum flow area encountered by the gas flowing from the reservoir 20 and, of course, the nozzle 23 not only has a minimum flow area or throat area but also has a discharge coefficient. The minimum flow area encountered by the gas flow while flowing from the reservoir 20 could be other than the opening 23 formed by the explosive 21 and could be a constructed nozzle formed in the reservoir 20 or immediately outwardly of the reservoir 20. The throat area and the discharge coefficient of the nozzle 23, i.e., the minimum flow area encountered by the gas, whether the nozzle be formed as the opening 23 in the preferred embodiment or constructed as part of the reservoir or otherwise, are important to the construction of an operative safety system which provides for inflation of the confinement 15 within the prescribed amount of time.

The explosive 21 is ignited at, what might be considered, time zero, or at the instant of the impact of the collision. At the instant of ignition of the explosive 21, the occupant 12 and the safety apparatus 10 will be in the condition illustrated in FIG. 1. Since the gas in the reservoir 20 is preferably nitrogen, flow through the opening or nozzle 23 is at sonic speed. The gas then flows through the opening 23 and into the chamber 25, and then through the slots 29 in the diffuser member 27 and into the confinement 15. This flow is at an extremely rapid rate to effect inflation of the confinement 15 to the condition shown in FIG. 2 within a range of time between .010 and .100 second after the instant of impact. Therefore, the confinement 15 takes the position shown in FIG. 2, which is the inflated condition of the confinement 15 within that particular time range.

Figure 2:
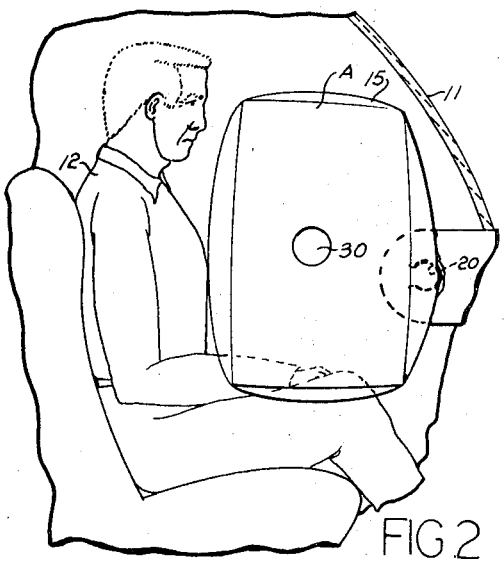

This inflation of the confinement 15 occurs rapidly enough so that the confinement becomes inflated prior to any substantial movement of the occupant 12 of the vehicle relative to the vehicle as a result of the collision. As illustrated in FIG. 2, the confinement has been inflated prior to any movement of the occupant 12 of the vehicle. It should be apparent that, as a practical matter, the occupant of the vehicle 12 may have moved somewhat; however, the amount of movement of the occupant would be minimal and certainly would not have been sufficient within the time interval to cause the occupant to have a forceful impact with any structural part of the vehicle.

Figure 3:
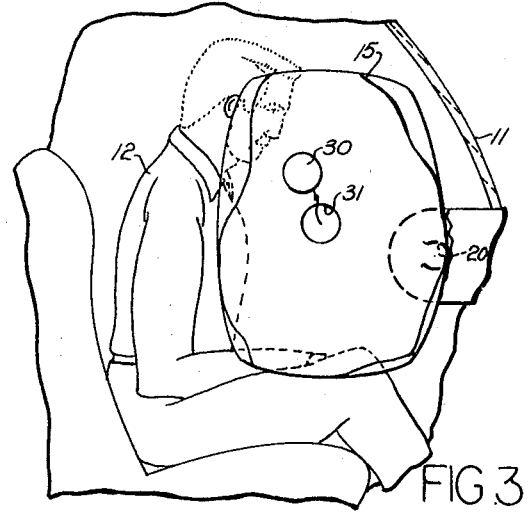

The pressure of the gas in the confinement 15, when inflated, is maintained such that the occupant can move into the confinement 15, such as shown in FIG. 3. The pressure in the confinement 15, which is designated hereinafter as $P_B$, is approximately atmospheric pressure during inflation. Moreover, the volume of the confinement $V_B$ is such as to provide an effective control on the occupant and is of sufficient size to substantially fill the volume of the vehicle between the occupant and the structural part of the vehicle which the occupant may engage during the collision. In the embodiment shown, the volume of the confinement 15 is such as to substantially fill the volume between the occupant and the dashboard of the vehicle.

The confinement 15 is provided with a means in the form of a blowout patch 30 which provides for maintaining the pressure within the confinement 15 substantially constant even though the confinement 15 and occupant have engaged. The blowout patch 30 is specifically described in detail in application Ser. No. 621,846 (now abandoned) assigned to the assignee of the present invention, and blows out to form an opening or hole 31 in the confinement 15 when the pressure in the confinement 15 reaches a predetermined degree. The pressure in the confinement 15 could reach that predetermined degree by the flow of fluid into the confinement 15 or by the impact of the occupant with the confinement 15. When the blowout patch 30 is removed, the opening 31 provides for flow of gas from the confinement 15. In this manner, the pressure in the confinement 15 is maintained substantially constant, particularly in view of the fact that the confinement 15 is made of a material, such as hypolon-coated nylon, which stretches somewhat and thereby effects a varying of the size of the opening 31 in the confinement 15 as the occupant moves into the confinement.

Moreover, the volume of the pressure reservoir $V_R$ is such as to provide a continuing flow of gas into the confinement 15 for a predetermined time interval. This continuing flow of gas into the confinement 15 after initial inflation of the confinement 15 maintains the confinement 15 in a substantially inflated condition providing for a continuous restraint on the occupant of the vehicle over a suitable time interval.

From the above, it should be apparent that the condition of the confinement and safety apparatus 10 when the occupant and confinement 15 are in the positions shown, by way of example, in FIG. 3, is such that the fluid is flowing from the opening 31 provided by the blowout patch 30 and that gas is still flowing into the confinement 15 from the fluid reservoir 20. At this time the confinement is applying a restraining force to the occupant 12 of the vehicle so as to reduce or restrain the movement of the occupant 12 relative to the vehicle, so that the occupant 12 will not have a forceful impact with a structural part of the vehicle.

Figure 4:
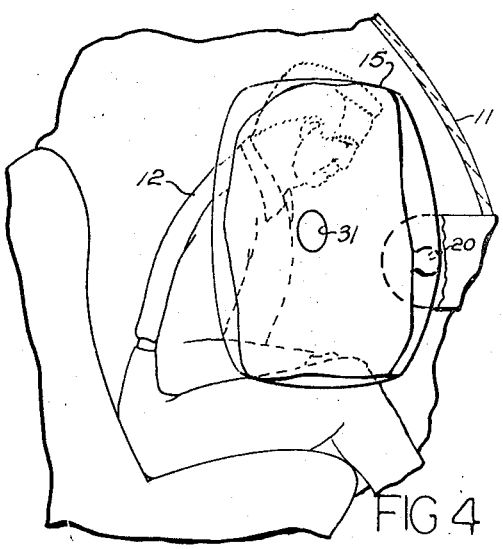
Figure 5:
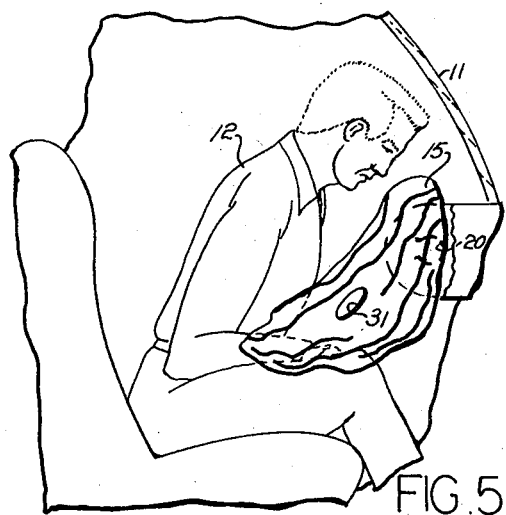

As shown in FIG. 4, the occupant of the vehicle 12 has moved further forward with respect to the confinement 15 and in the position shown in FIG. 4 is restrained. The flow of gas from reservoir 20 may have at this time stopped. However, flow of gas is continuing from the opening 31. Since the flow of gas continues from the opening 31, after a time interval, the confinement 15 will be deflated, and the occupant 12 of the vehicle will have been substantially restrained throughout a time interval. Eventually, the confinement will become deflated to a condition, such as illustrated in FIG. 5.

After substantial amount of research and development, it has been discovered that the various structural elements of the safety apparatus 10 must be constructed in accordance with certain mathematical relationships in order to provide an effective and reliable safety system which is sufficiently practical and reliable to be actually utilized in an automotive vehicle. These various relationships are set forth hereinbelow, and the equations which determine the relationships are derived hereinbelow. The various elements utilized in the mathematical derivation hereinbelow are as follows:

$K$ = ratio of specific heats of the gas, $C_p/C_v$
$C$ = discharge coefficient of nozzle 23
$A$ = throat area of nozzle 23
$U_0$ = sound speed in the gas reservoir
$t$ = time
$V_R$ = volume of reservoir 20
$P_R$ = pressure in reservoir 20 when opened
$P_0$ = pressure in reservoir 20 at time zero
$T_R$ = reservoir temperature
$T_0$ = reservoir temperature at time zero
$M_R$ = the mass of gas in the reservoir 20 after opened
$M_0$ = the mass of gas in the reservoir 20 at time zero
$T_B$ = the confinement temperature
$M_B$ = the mass of the gas in the confinement 15
$P_B$ = the pressure of the gas in the confinement
$V_B$ = the volume of the confinement
$M$ = mass flow rate out of reservoir
$P = P_r$ $$g = 32.16 \frac{lb_F}{lb_M} \frac{ft.}{sec.^2}$$

$T$ = absolute temperature ° Rankine (res.) $T_R$
$R$ = gas constant
$M = M_R$

Flow through a choked nozzle, such as nozzle 23 is:

$$\dot{M} = CAP \sqrt{\frac{g}{RT} K \left(\frac{2}{K+1}\right)^{\left(\frac{K+1}{K-1}\right)}} \quad \text{(Eq. 1)}$$

Separating out constants we have $$\dot{M} = CA \sqrt{\frac{g}{R} K \left(\frac{2}{K+1}\right)^{\left(\frac{K+1}{K-1}\right)}} P \sqrt{\frac{1}{T}} \quad \text{(Eq. 2)}$$

Introducing the reservoir initial condition $P_0$ and $T_0$ $$\dot{M} = CA \sqrt{\frac{g}{R} K \left(\frac{2}{K+1}\right)^{\left(\frac{K+1}{K-1}\right)}} \frac{P_0}{P_0} \sqrt{\frac{T_0}{T_0}} P \sqrt{\frac{1}{T}} \quad \text{(Eq. 3)}$$

Rearranging terms $$\dot{M} = CAP_0 \sqrt{\frac{g}{RT_0} K \left(\frac{2}{K+1}\right)^{\left(\frac{K+1}{K-1}\right)}} \frac{P}{P_0} \sqrt{\frac{T_0}{T}} \quad \text{(Eq. 4)}$$

Letting $$CAP_0 \sqrt{\frac{g}{RT_0} K \left(\frac{2}{K+1}\right)^{\left(\frac{K+1}{K-1}\right)}} = \text{the constant } X$$

then $$\dot{M} = X \frac{P}{P_0} \sqrt{\frac{T_0}{T}} \quad \text{(Eq. 5)}$$

Since the reservoir undergoes isentropic expansion $$PV^K = \text{constant} \quad \text{(Eq. 6)}$$

Raising Equation 6 to the $1/K$ power we have $$(PV^K)^{1/K} = P^{1/K}V = (\text{constant})^{1/K} \quad \text{(Eq. 7)}$$

Separating out PV from Equation 7

$$P^{1/K}V = P^{\left(\frac{1}{K}-1\right)} PV = P^{\left(\frac{1-K}{K}\right)} PV = (\text{constant})^{1/K} \quad \text{(Eq. 8)}$$

Substituting for PV in Equation 8 using the perfect gas law, $$P^{\left(\frac{1-K}{K}\right)} PV = P^{\left(\frac{1-K}{K}\right)} MRT = (\text{constant})^{1/K} \quad \text{(Eq. 9)}$$

Dividing Equation 9 by MR gives $$P^{\left(\frac{1-K}{K}\right)} T = (\text{constant})^{1/K}/(MR) \quad \text{(Eq. 10)}$$

Since a function of constants is a constant and introducing the reservoir initial conditions $P_0$ and $T_0$ the following relationship is derived from Equation 10:

$$P^{\left(\frac{1-K}{K}\right)} T = P_0^{\left(\frac{1-K}{K}\right)} T_0 \quad \text{(Eq. 11)}$$

Dividing Equation 11 by $$TP_0^{\left(\frac{1-K}{K}\right)}$$

provides $$\frac{P^{\left(\frac{1-K}{K}\right)}}{P_0^{\left(\frac{1-K}{K}\right)}} = \left(\frac{P}{P_0}\right)^{\left(\frac{1-K}{K}\right)} = \frac{T_0}{T} \quad \text{(Eq. 12)}$$

Raising Equation 12 by the ½ power provides $$\left[\left(\frac{P}{P_0}\right)^{\left(\frac{1-K}{K}\right)}\right]^{1/2} = \left(\frac{P}{P_0}\right)^{\left(\frac{1-K}{2K}\right)} = \left(\frac{T}{T_0}\right)^{1/2} = \sqrt{\frac{T_0}{T}} \quad \text{(Eq. 13)}$$

Substituting for $\sqrt{T_0/T}$ using Equation 13 into Equation 5

$$\dot{M} = X \frac{P}{P_0} \sqrt{\frac{T_0}{T}} = X \left(\frac{P}{P_0}\right)\left(\frac{P}{P_0}\right)^{\left(\frac{1-K}{2K}\right)} = \left(\frac{P}{P_0}\right)^{\left(1+\frac{1-K}{2K}\right)}$$

$$= X \left(\frac{P}{P_0}\right)^{\left(\frac{2K+1-K}{2K}\right)} = \left(\frac{P}{P_0}\right)^{\left(\frac{K+1}{2K}\right)} \quad \text{(Eq. 14)}$$

Since the fluid mass left in the reservoir at any time equals the original mass less the time integral of mass flow (Equation 14)

$$M = M_0 - \int_0^t X \left(\frac{P}{P_0}\right)^{\left(\frac{K+1}{2K}\right)} dt \quad \text{(Eq. 15)}$$

Multiplying Equation 15 by $-1$ gives $$-M = -M_0 + \int_0^t X \left(\frac{P}{P_0}\right)^{\left(\frac{K+1}{2K}\right)} dt \quad \text{(Eq. 16)}$$

Adding $M_0$ to both sides of Equation 16 gives $$M_0 - M = \int_0^t X \left(\frac{P}{P_0}\right)^{\left(\frac{K+1}{2K}\right)} dt \quad \text{(Eq. 17)}$$

Dividing the perfect gas law ($PV=MRT$) by RT results in $$M=\frac{PV}{RT} \qquad \text{(Eq. 18)}$$

Upon introducing the reservoir initial conditions $P_0$, $T_0$ and $M_0$ gives $$M_0=\frac{P_0V}{RT_0} \qquad \text{(Eq. 19)}$$

Substituting for M using Equation 18 and $M_0$ using Equation 19 into Equation 17 gives $$\frac{P_0V}{RT_0}-\frac{PV}{RT}=\int_0^t X\left(\frac{P}{P_0}\right)^{\left(\frac{K+1}{2K}\right)}dt \qquad \text{(Eq. 20)}$$

Introducing $P_0/P_0$ and $T_0/T_0$ and rearranging gives $$\frac{P_0V}{RT_0}-\frac{P_0}{P_0}\frac{T_0}{T_0}\frac{PV}{RT}=\frac{P_0V}{RT_0}-\frac{P_0V}{RT_0}\frac{P}{P_0}\frac{T_0}{T}$$

$$=\frac{P_0V}{RT_0}\left(1-\frac{P}{P_0}\frac{T_0}{T}\right)=\int_0^t X\left(\frac{P}{P_0}\right)^{\left(\frac{K+1}{2K}\right)}dt$$

(Eq. 21)

Substituting for $T_0/T$ using Equation 12 into Equation 21 gives $$\frac{P_0V}{RT_0}\left(1-\frac{P}{P_0}\left[\frac{P}{P_0}\right]^{\left(\frac{1-K}{K}\right)}\right)=\frac{P_0V}{RT_0}\left(1-\left[\frac{P}{P_0}\right]^{\frac{1}{K}}\right)$$

$$=\int_0^t X\left(\frac{P}{P_0}\right)^{\left(\frac{K+1}{2K}\right)}dt$$

(Eq. 22)

Differentiating Equation 22 noting that the differential of an integral of a function is that function and the differential of $$\left(\frac{P}{P_0}\right)^N=N\left(\frac{P}{P_0}\right)^{N-1}d\left(\frac{P}{P_0}\right)$$

results in $$\frac{P_0V}{RT_0}\left(0-\frac{1}{K}\left(\frac{P}{P_0}\right)^{\left(\frac{1-K}{K}\right)}\right)d\left(\frac{P}{P_0}\right)=X\left(\frac{P}{P_0}\right)^{\left(\frac{K+1}{2K}\right)}dt$$

(Eq. 23)

Dividing Equation 23 by $$X\left(\frac{P}{P_0}\right)^{\left(\frac{K+1}{2K}\right)}$$

$$-\frac{P_0V}{KRT_0X}\left(\left[\frac{P}{P_0}\right]^{\left(\frac{1-K}{K}\right)}\left[\frac{P}{P_0}\right]^{\left(\frac{-K-1}{2K}\right)}\right)d\left(\frac{P}{P_0}\right)=dt$$

(Eq. 24)

which upon term consolidation is $$-\frac{P_0V}{KRT_0X}\left(\frac{P}{P_0}\right)^{\left(\frac{1-3K}{2K}\right)}d\left(\frac{P}{P_0}\right)=dt \qquad \text{(Eq. 25)}$$

Equation 25 when put in integral form is $$-\frac{P_0V}{KRT_0X}\int_0^{P/P_0}\left(\frac{P}{P_0}\right)^{\left(\frac{1-3K}{2K}\right)}d\left(\frac{P}{P_0}\right)=\int_0^t dt$$

(Eq. 26)

Noting that the integral of $$\left(\frac{P}{P_0}\right)^N d\left(\frac{P}{P_0}\right)=\frac{1}{N+1}\left(\frac{P}{P_0}\right)^{N+1}$$

gives $$-\frac{P_0V}{KRT_0X}\left[\frac{(P/P_0)\left(\frac{P}{P_0}\right)^{\left(\frac{1-K}{2K}\right)}}{\frac{1-K}{2K}}\right]_1^{P/P_0}=t\Big|_0^t$$

$$=\frac{2P_0V}{(K-1)RT_0X}\left[\left(\frac{P}{P_0}\right)^{\left(\frac{1-K}{2K}\right)}\right]_1^{P/P_0}=t\Big|_0^t$$

(Eq. 27)

which upon substitution of limits is $$\frac{2P_0V}{(K-1)RT_0X}\left(\left(\frac{P}{P_0}\right)^{\left(\frac{1-K}{2K}\right)}-1\right)=t-0$$

(Eq. 28)

Multiplying Equation 28 by $$\frac{(K-1)RT_0X}{2P_0V}$$

gives $$\left(\frac{P}{P_0}\right)^{\left(\frac{1-K}{2K}\right)}-1=\frac{(K-1)RT_0X}{2P_0V} \qquad \text{(Eq. 29)}$$

Substitution of $$CAP_0\sqrt{\frac{g}{RT_0}K\left(\frac{2}{K+1}\right)^{\left(\frac{K+1}{K-1}\right)}}$$

for X and the addition of 1 to Equation 29 results in $$\left(\frac{P}{P_0}\right)^{\left(\frac{1-K}{2K}\right)}$$

$$=\frac{(K-1)RT_0CAP_0\sqrt{\frac{Kg}{RT_0}\left(\frac{2}{K+1}\right)^{\left(\frac{K+1}{K-1}\right)}}}{2P_0V}t+1$$

(Eq. 30)

Simplification of the $RT_0$ and $P_0$ terms gives $$\left(\frac{P}{P_0}\right)^{\left(\frac{1-K}{2K}\right)}=\frac{(K-1)CA\sqrt{KgRT_0}\left(\frac{2}{K+1}\right)^{\left(\frac{K+1}{2K-2}\right)}}{2V}t+1$$

(Eq. 31)

Since the initial reservoir sound speed $U_0=\sqrt{KgRT_0}$, this substitution into Equation 31 results in $$\left(\frac{P}{P_0}\right)^{\left(\frac{1-K}{2K}\right)}=\frac{(K-1)CAU_0\left(\frac{2}{K+1}\right)^{\left(\frac{K+1}{2K-2}\right)}}{2V}t+1$$

(Eq. 32)

Letting $$\frac{(K-1)\left(\frac{2}{K+1}\right)^{\left(\frac{K+1}{2K-2}\right)}CAU_0}{2}\frac{t+1}{V}$$

=the linear function of time Z gives $$\left(\frac{P}{P_0}\right)^{\left(\frac{1-K}{2K}\right)}=Z \qquad \text{(Eq. 33)}$$

Raising Equation 33 by the $$\frac{2K}{1-K}$$

power gives $$\frac{P}{P_0} = Z^{\left(\frac{2K}{1-K}\right)} \quad (Eq. 34)$$

Substitution of $$\left(\frac{P}{P_0}\right)$$

from Equation 34 into Equation 12 results in $$T_0/T = \left[(Z)^{\left(\frac{2K}{1-K}\right)}\right]^{\left(\frac{1-K}{K}\right)} = Z^2 \quad (Eq. 35)$$

Or by inverting Equation 35

$$T/T_0 = Z^{-2} \quad (Eq. 26)$$

Dividing Equation 18 by Equation 19 provides $$\frac{M}{M_0} = \frac{\frac{PV}{RT}}{\frac{P_0 V}{RT_0}} = \frac{PVRT_0}{P_0VRT} = \frac{P}{P_0}\frac{T_0}{T} \quad (Eq. 37)$$

Substitution for $$\left(\frac{P}{P_0}\right)$$

from Equation 34 and $$\left(\frac{T}{T_0}\right)$$

from Equation 35 into Equation 37 gives $$\frac{M}{M_0} = Z^{\left(\frac{2K}{1-K}\right)} Z^2 = Z^{\left(\frac{2K+2-2K}{1-K}\right)} = Z^{\left(\frac{2}{1-K}\right)} \quad (Eq. 38)$$

As all work so far has considered only properties of the reservoir rewriting Equation 34, Equation 36 and Equation 38 gives $$\frac{P_R}{P_0} = Z^{\left(\frac{2K}{1-K}\right)} \quad (Eq. 39)$$

$$\frac{T_R}{T_0} = Z^{-2} \quad (Eq. 40)$$

$$\frac{M_R}{M_0} = Z^{\frac{2}{1-K}} \quad (Eq. 41)$$

where:

$$Z = (K-1)\left(\frac{2}{K+1}\right)^{\left(\frac{K+1}{2K-2}\right)} CAU_0 t/(2V_R) = 1$$

By mass conservation:

$$M_0 = M_R + M_B \quad (Eq. 42)$$

Dividing Equation 42 by $M_0$ gives $$1 = \frac{M_R}{M_0} + \frac{M_B}{M_0} \quad (Eq. 43)$$

Subtracting $M_R/M_0$ results in $$\frac{M_B}{M_0} = 1 - \frac{M_R}{M_0} \quad (Eq. 44)$$

Substitution of $$Z^{\left(\frac{2}{1-K}\right)}$$

for $M_R/M_0$ by Equation 41 into Equation 44 gives $$\frac{M_B}{M_0} = 1 - Z^{\left(\frac{2}{1-K}\right)} \quad (Eq. 45)$$

By energy conservation, the enthalpy change of the gas in the safety apparatus equals the work done on the atmosphere and the confinement.

$$H_0 - H_R - H_B = W \quad (Eq. 46)$$

The enthalpy of a perfect gas is $$H = MC_p T \quad (Eq. 47)$$

Upon substitution of $$\left(\frac{PV}{RT}\right)$$

for (M) using Equation 18, Equation 47 becomes $$H = \frac{PV}{RT}C_p T = \frac{PV}{R}C_p \quad (Eq. 48)$$

However, by the definition of K $$\frac{C_p}{C_v} = K \quad (Eq. 49)$$

And for a perfect gas $$C_p = C_v + R \quad (Eq. 50)$$

Multiplication of Equation 49 by $C_v$ results in $$C_p = KC_v \quad (Eq. 51)$$

Substitution for $C_p$ in Equation 50 by Equation 51 gives $$KC_v = C_v + R \quad (Eq. 52)$$

Subtraction of $C_v$ from Equation 52 gives $$KC_v - C_v = C_v(K-1) = R \quad (Eq. 53)$$

Division of Equation 51 by K results in $$C_v = C_p/K \quad (Eq. 54)$$

Substitution of $C_p/K$ for $C_v$ into Equation 53 by Equation 54 gives $$\frac{C_p}{K}(K-1) = R \quad (Eq. 55)$$

Multiplication of Equation 55 by $$\left(\frac{K}{R(K-1)}\right)$$

results in $$\frac{C_p}{R} = \frac{K}{K-1} \quad (Eq. 56)$$

Substitution of $$\left(\frac{K}{K-1}\right) \text{ for } \left(\frac{C_p}{R}\right)$$

by Equation 56 into Equation 48

$$H = PV\frac{K}{K-1} \quad (Eq. 57)$$

Assuming the confinement expands with a constant internal gas pressure ($P_B$) from a negligible internal volume to some volume ($V_B$) the work done on the atmosphere and cushion is $$W = P_B V_B \quad (Eq. 58)$$

Substituting for (H) using Equation 57 while adding the corresponding subscripts 0, R, or B and for (W) using Equation 58 into Equation 46 gives $$P_0 V_R \left(\frac{K}{K-1}\right) - P_R V_R \left(\frac{K}{K-1}\right)$$
$$- P_B V_B \left(\frac{K}{K-1}\right) = P_B V_B \quad (Eq. 59)$$

Multiplying Equation 59 by $$\left(\frac{K-1}{K}\right)$$

results in $$P_0V_R - P_RV_R - P_BV_B = P_BV_B\left(\frac{K-1}{K}\right) \quad (Eq. 60)$$

Adding $P_BV_B$ to Equation 60 gives $$P_0V_R - P_RV_R = P_BV_B + P_BV_B\left(\frac{K-1}{K}\right)$$
$$= P_BV_B\left(1 + \frac{K-1}{K}\right) \quad (Eq. 61)$$

Dividing by $P_0V_R$ and simplifying gives $$1 - \frac{P_R}{P_0} = \frac{P_BV_B}{P_0V_R}\left(\frac{2K-1}{K}\right) \quad (Eq. 62)$$

Substituting for $P_R/P_0$ by Equation 39 into Equation 62 results in $$1 - Z^{\left(\frac{2K}{1-K}\right)} = \frac{P_BV_B}{P_0V_R}\left(\frac{2K-1}{K}\right) \quad (Eq. 63)$$

Multiflying Equation 63 by $$\left(\frac{K}{2K-1}\right)$$

gives $$\frac{P_BV_B}{P_0V_R} = \left(\frac{K}{2K-1}\right)\left(1 - Z^{\left(\frac{2K}{1-K}\right)}\right) \quad (Eq. 64)$$

Substitution of ($M_BRT_B$) for $P_BV_B$ and ($M_0RT_0$) for $P_0V_R$ by the perfect gas law into Equation 64 results in $$\frac{M_B}{M_0}\frac{R}{R}\frac{T_B}{T_0} = \left(\frac{K}{2K-1}\right)\left(1 - Z^{\left(\frac{2K}{1-K}\right)}\right) \quad (Eq. 65)$$

Substitution of $$1 - Z^{\frac{2}{1-K}}$$

for $M_B/M_0$ by Equation 45 into Equation 65 gives $$\left[1 - (Z)^{\frac{2}{1-K}}\right]\frac{T_B}{T_0} = \frac{K}{2K-1}\left(1 - Z^{\frac{2}{1-K}}\right) \quad (Eq. 66)$$

Dividing Equation 66 by $$\left(1 - Z^{\frac{2}{1-K}}\right)$$

results in $$\frac{T_B}{T_0} = \frac{K}{2K-1}\left(1 - Z^{\frac{2K}{1-K}}\right)\Big/\left(1 - Z^{\frac{2}{1-K}}\right) \quad (Eq. 67)$$

Since K is greater than 1, the ratio $$\left(\frac{T_B}{T_0}\right)$$

takes on values varying from $$\left(\frac{K^2}{2K-1}\right)$$

when time=0 to $$\frac{K}{2K-1}$$

when time=∞.
Since:

$$Z = (K-1)\left(\frac{2}{K+1}\right)^{\left(\frac{K+1}{2K-2}\right)}\frac{CAU_0t}{2V_R} + 1$$

As $t$ increases, Z increases, and when $t=0$, $Z=0$, and when $t=\infty$, $Z=\infty$.
Also:

$$\frac{P_BV_B}{P_0V_R}^{(at\ time=t)} = \frac{K}{2K-1}\left(1 - Z^{\left(\frac{2K}{1-K}\right)}\right) \text{ at time } t \quad (Eq. 64)$$

during filling.
And $$\frac{P_BV_B}{P_0V_R}^{(at\ t=\infty)} = \frac{K}{2K-1} \text{ at time } t=\infty \quad (Eq. 68)$$

Dividing Equation 64 by Equation 68 and since $P_B$ is a constant $$\left(\frac{P_BV_B}{P_0V_R}\right)^{(time=t)} \Big/ \left(\frac{P_0V_B}{P_BV_B}\right)^{(time=\infty)}$$

$$= \left(\frac{2K-1}{K}\right)\left(1 - Z^{\left(\frac{2K}{1-K}\right)}\right) \Big/ \left(\frac{2K-1}{K}\right)$$

$$\frac{V_B}{V_B}\left(\frac{time\ t}{time\ \infty}\right) = 1 - Z^{\left(\frac{2K}{1-K}\right)} \quad (Eq. 69)$$

Summary:

If:   $K$=any value   $K$=1.4

$$Z = (K-1)\left(\frac{2}{K+1}\right)^{\left(\frac{K+1}{2K-2}\right)}CAU_0t/(2V_R)+1$$
$$= .11574CAU_0t/V_R+1$$

$$\frac{P_R}{P_0} = Z^{\left(\frac{2K}{1-K}\right)} = Z^{-7} \quad (Eq. 39)$$

$$\frac{T_R}{T_0} = Z^{-2} = Z^{-2} \quad (Eq. 40)$$

$$\frac{M_R}{M_0} = Z^{\left(\frac{2}{1-K}\right)} = Z^{-5} \quad (Eq. 41)$$

$$\frac{T_B}{T_0} = \frac{K}{2K-1}\left(1 - Z^{\left(\frac{2K}{1-K}\right)}\right)\Big/\left(1 - Z^{\left(\frac{2}{1-K}\right)}\right) = \frac{7}{9}\left(\frac{1-Z^{-7}}{1-Z^{-5}}\right) \quad (67)$$

$$\frac{M_B}{M_0} = 1 - Z^{\left(\frac{2}{1-K}\right)} = 1 - Z^{-5} \quad (Eq. 45)$$

$$\frac{P_BV_B}{P_0V_R} = \frac{K}{2K-1}\left(1 - Z^{\left(\frac{2K}{1-K}\right)}\right) = \frac{7}{9}(1-Z^{-7}) \quad (Eq. 64)$$

$$\frac{V_Bt}{V_B\infty} = 1 - Z^{\left(\frac{2K}{1-K}\right)} = (1-Z^{-7}) \quad (Eq. 69)$$

From the above, it should be apparent that certain assumptions were made. The following specific assumptions were made:

(A) Perfect gas law ($PV=MRT$)
(B) Constant specific heat
(C) Constant confinement pressure fill ($W=P_BV_B$)
(D) Sonic flow at nozzle throat $$\left(Z^{\left(\frac{2K}{1-K}\right)} > \frac{P_B}{P_0}\left(\frac{K+1}{2}\right)^{\left(\frac{K}{K+1}\right)}\right)$$

If $K=1.4\left(Z^{-7} > \frac{P_B}{P_0}1.8929\right)$ (E) Heat added by explosive or similar actuating means is negligible.
(F) Volume added by explosive or similar actuating means is negligible.
(G) Small amount of total heat in the gas flow is transferred to the diffuser and reservoir.
(H) Density of material of confinement 15 or any porosity thereof and the blow-out patch 30 have no effect on the derivation. The equations, of course, cover the conditions until the blow-out patch 30 opens, which is after the confinement is full.

The following should be noted with respect to the above assumptions.

(A) Perfect gas law: A gas deviates from this law the closer it is to liquification and here the more sensitive is $P_B V_B / P_0 V_R$ to reservoir temperature change.

(B) Constant specific heat: At the temperature of interest (600° R. and below) this assumption is valid.

(C) Constant confinement pressure fill: This assumption is valid since the pressure $P_B$ of the confinement 15 equals atmospheric pressure if the confinement material is weak. If the confinement material were strong as steel, it would require a nearly constant pressure to expand the confinement.

(D) For any reasonable system ($P_0 \approx 2000$ p.s.i.) the confinement reaches 98+% of its ($t \to \infty$) asymptotic fill volume before the flow in the nozzle becomes subsonic. It should again be emphasized that the nozzle is the minimum area flow section encountered by the gas neither constructed or formed by the explosion.

(E) and (F) Actuating means effect on bag volume is as the magnitude of $M_E C_{PE} T_E / M_0 C_{P0} T_0$ and $$M_E R_E T_E / M_0 C_{P0} T_0$$

where the sub E of a quantity indicates the quantity related to the explosion charge 21. Therefore, if $$M_E T_E / M_0 T_0$$

becomes small as compared to 1, they can be safely ignored. Otherwise, an energy balance must be performed between the explosive gas products $M_E$ and the reservoir gas in the confinement $M_B$, i.e., $$T_B' = \frac{M_E C_{PE} T_E + M_B C_{PB} T_B}{M_E C_{PE} + M_B C_{PB}}$$

and $P_B V_B' = (M_E R_E + M_B R_B) T_B'$. In the described system, the volume addition due to the explosive is of the order 5% which can be ignored.

(G) Also the equations assume only a small amount of the total heat in the gas flow is transferred to the reservoir and diffuser which seems to be the case. Were the flow isothermal rather than adiabatic (perfect heat transfer to an infinite weight reservoir and diffuser) the effect on confinement volume would be only 5% at $$\left(\frac{CAU_0 T}{V_R}\right) = 1$$

and 10% at $$\left(\frac{CAU_0 T}{V_R}\right) = 1\frac{1}{2}$$

Utilizing the above mathematical equations, a vehicle safety apparatus can be designed which is extremely practical and highly reliable in operation. In the design in the system the pressure ($P_B$) in the confinement 15 and the volume ($V_B$) of the confinement 15 are determined by the particular job which the confinement is to perform. The volume ($V_B$) of the confinement 15 will vary depending upon the size of the automotive vehicle and the particular location in the automotive vehicle which the confinement 15 takes. Moreover, it is desired that approximately 20 to 95% of the gas available in the reservoir 20 be used to effect inflation thereof. This is desirable because an amount of fluid flow is desired to be continued into the confinement 15 after the blowout patch 30 is removed. This, in effect, means that the ratio of the volume of the confinement 15 at inflation time, namely, by time $t$, to the volume of the confinement 15 at time infinite, which is what the volume of the confinement 15 would be if 100% of the fluid in the reservoir 20 were utilized to effect inflation is within the range of 20–95%. From Equation 69:

$$\frac{V_B t}{V_B \infty} = 1 - Z^{\left(\frac{2K}{1-K}\right)} = (20\% \text{ to } 95\%)$$

As a result, for $K = 1.4$ (nitrogen) $Z$ can be determined by substituting the calculated range for $Z$ into the Equation 64 and since the pressure ($P_B$) and volume ($V_B$) of the confinement are known, the product $P_0 V_R$ can be solved. The product $P_0 V_R$ must be within the range:

$$(5 \text{ to } 1.05)\left(\frac{2K-1}{K}\right)(P_B V_B) = P_0 V_R$$

Moreover, as noted hereinabove, the time for inflation of the confinement 15 is preferably within the range of .010 to .100 second. Therefore, the properties, namely, the discharge coefficient (C) of the nozzle 23 and the throat area of the nozzle 23 may be calculated as follows:

$$Z = (K-1)\left(\frac{2}{K+1}\right)^{\left(\frac{K+1}{2K-2}\right)} \frac{CAU_0 t}{2V_R} + 1$$

$$\frac{CAU_0 t}{2V_R} = .28 \text{ to } 4.41 \text{ for range of } Z$$

the .28 for a 20% mass utilization and the 4.41 for 95% mass utilization. In order to have a highly operative system and a reliable system the system should be constructed so that the product of $P_0 V_R$ is equal to (5 to 1.05) times $2K-1$ divided by K and times $P_B V_B$ and the quantity $CAU_0 t / 2V_R$ should lie within the range of .28 to 4.41 and inflation time is aqual to .010 to .100 second.

Figure 7:
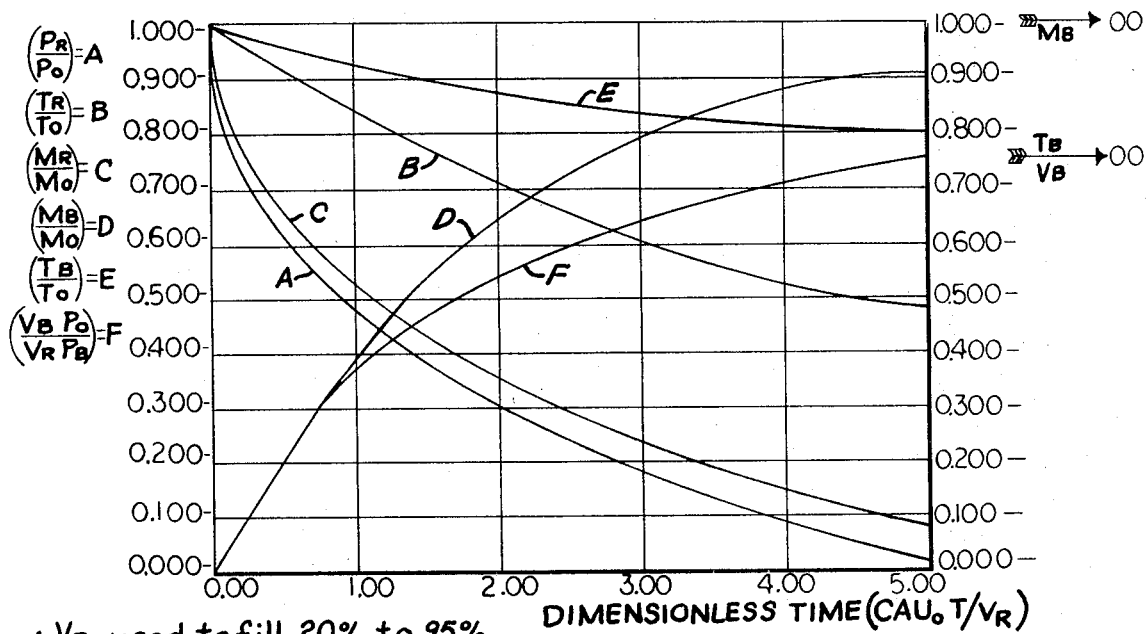
FIG. 7 is a graph illustrating graphically various structural relationships of the vehicle safety apparatus.

The graph constituting FIG. 7 shows graphically certain mathematical relationships. These relationships will not be described since the coding thereon is self-explanatory. From the graph, the operative range of the various relationships can be readily determined since the operative range of the dimensionless time function is .28 to 4.41.

It should be apparent that applicant has described hereinabove in great detail a highly practical and reliable vehicle safety apparatus which operates to protect an occupant of the vehicle during a collision.

Having described my invention, I claim:

1. A vehicle safety apparatus comprising a confinement having a collapsed inoperative condition and an expanded operative condition in which said confinement protects an occupants of a vehicle by restraining movement of the occupant during a collision, said confinement having exhaust means operable at a predetermined pressure value to release fluid therefrom to thereby dissipate kinetic energy of the occupant absorbed by the confinement and thus minimize rebound of the occuppant from the confinement, and means defining a reservoir for containing a supply of gas, said reservoir having a volume $V_R$ and a gas pressure $P_0$, means for effecting flow of gas from said reservoir to effect deployment of said confinement into its operative position, said confinement when initially deployed in its operative position having a volume $V_B$ and pressure $P_B$ therein, said gas flowing through a nozzle comprising the minimum flow area encountered by said gas while flowing from said reservoir, the product of $P_0 V_R$ being within the range of $$(5 \text{ to } 1.05)\frac{2K-1}{K}P_B V_B$$

where K equals the ratio of specific heats of gas $C_P/C_V$, said nozzle having a discharge coefficient C and throat area A within the range determined by the equation $$\frac{CAU_0 t}{V_R} = .28 \text{ to } 4.41$$

where:
$U_0$ = sound speed of fluid flow in said reservoir at the initial instant of flow,
$t$ = time for deployment of said confinement to its initial operative position and equals .010 to .100 secs. and
$V_R$ = volume of reservoir.

2. A vehicle safety apparatus as defined in claim 1 wherein said gas comprises nitrogen and has a K equal to approximately 1.4.

3. A vehicle safety apparatus as defined in claim 1 wherein said means for effecting flow of gas from said reservoir comprises means for effecting the formation of an opening in said reservoir with said opening comprising said nozzle.

4. A vehicle safety apparatus as defined in claim 3 wherein said means for effecting the formation of an opening in said reservoir comprises explosive means.

5. A vehicle safety apparatus as defined in claim 1 wherein a diffuser member is associated with said reservoir and is located in the fluid flow to said confinement.

6. A vehicle safety apparatus as defined in claim 1 wherein said fluid source provides a continued fluid flow into said confinement after the confinement is initially deployed in its operative position and the continued flow increases the pressure in said confinement above $P_B$ to said predetermined pressure at which said exhaust means releases fluid even though an occupant does not engage said confinement.

References Cited

UNITED STATES PATENTS

| | | | |
|---|---|---|---|
| 3,197,234 | 7/1965 | Bertrand | 280—150 |
| 3,411,807 | 11/1968 | Carey et al. | 280—150 |

KENNETH H. BETTS, Primary Examiner

UNITED STATES PATENT OFFICE
CERTIFICATE OF CORRECTION

Patent No. 3,516,685                    Dated June 23, 1970

Inventor(s)  George W. Goetz

It is certified that error appears in the above-identified patent and that said Letters Patent are hereby corrected as shown below:

In the drawings, sheet 2, Figure 7, cancel the language

">$:V_r$ used to fill 20% to 95%
of confinement within .010
to 0.100 second.
K = 1.4"

Signed and sealed this 27th day of April 1971.

(SEAL)
Attest:

EDWARD M. FLETCHER, JR.                WILLIAM E. SCHUYLER, JR.
Attesting Officer                       Commissioner of Patents